United States Patent [19]

Frost

[11] 3,938,634
[45] Feb. 17, 1976

[54] CLUTCH MECHANISM
[75] Inventor: Barry L. Frost, Jackson, Mich.
[73] Assignee: Clark Equipment Company, Buchanan, Mich.
[22] Filed: Jan. 22, 1975
[21] Appl. No.: 543,089

[52] U.S. Cl. ............... 192/56 F; 74/337; 192/56 L; 192/71
[51] Int. Cl.² ......................................... F16D 43/20
[58] Field of Search......... 192/56 R, 56 F, 56 L, 71; 74/337

[56] References Cited
UNITED STATES PATENTS

| | | | |
|---|---|---|---|
| 857,114 | 6/1907 | Schnaitmann | 192/71 X |
| 942,244 | 12/1909 | Boda | 192/71 X |
| 2,137,417 | 11/1938 | Schaefer | 192/56 |
| 2,190,447 | 2/1940 | Frazier | 192/71 |
| 2,412,208 | 12/1946 | Dence | 192/53 |
| 2,447,058 | 8/1948 | Dence | 192/48 |
| 2,558,656 | 6/1951 | Lapsley | 74/732 |
| 2,584,032 | 1/1952 | Lapsley | 74/732 |
| 2,683,512 | 7/1954 | Boice | 192/56 F |
| 3,024,885 | 3/1962 | Dence et al. | 192/53 |
| 3,270,579 | 9/1966 | Whisler | 74/325 |
| 3,379,034 | 4/1968 | Gustafson | 64/29 |
| 3,760,919 | 9/1973 | Gilsinger | 192/71 |

*Primary Examiner*—Allan D. Hermann
*Attorney, Agent, or Firm*—Ernst H. Ruf

[57] ABSTRACT

A clutch mechanism of the rocker-shift type has a carrier member interposed between and affixed to one of a rotatable driving and a rotatable driven member. The carrier member has circumferentially spaced rocker arms, having normally self-disengaging clutch portions, that are adapted to be rocked radially, on at least one end thereof, by means of a shift yoke and collar, for selective rocking engagement into coupling engagement with adjacent corresponding normally self-disengaging clutch portions on the other of the driving and driven members. The collar has locked neutral and locked engaged positions on the carrier, with the improvement comprising means for axially shifting the collar to an unlocked engaged position intermediate the locked neutral and locked engaged positions and yieldingly maintaining the collar in this unlocked engaged position at a predetermined torque level, with the collar being axially shifted back into locked neutral position as result of the separation of the self-disengaging clutch portions when the predetermined torque level is exceeded by the torque transfer between the driving and driven members.

13 Claims, 5 Drawing Figures

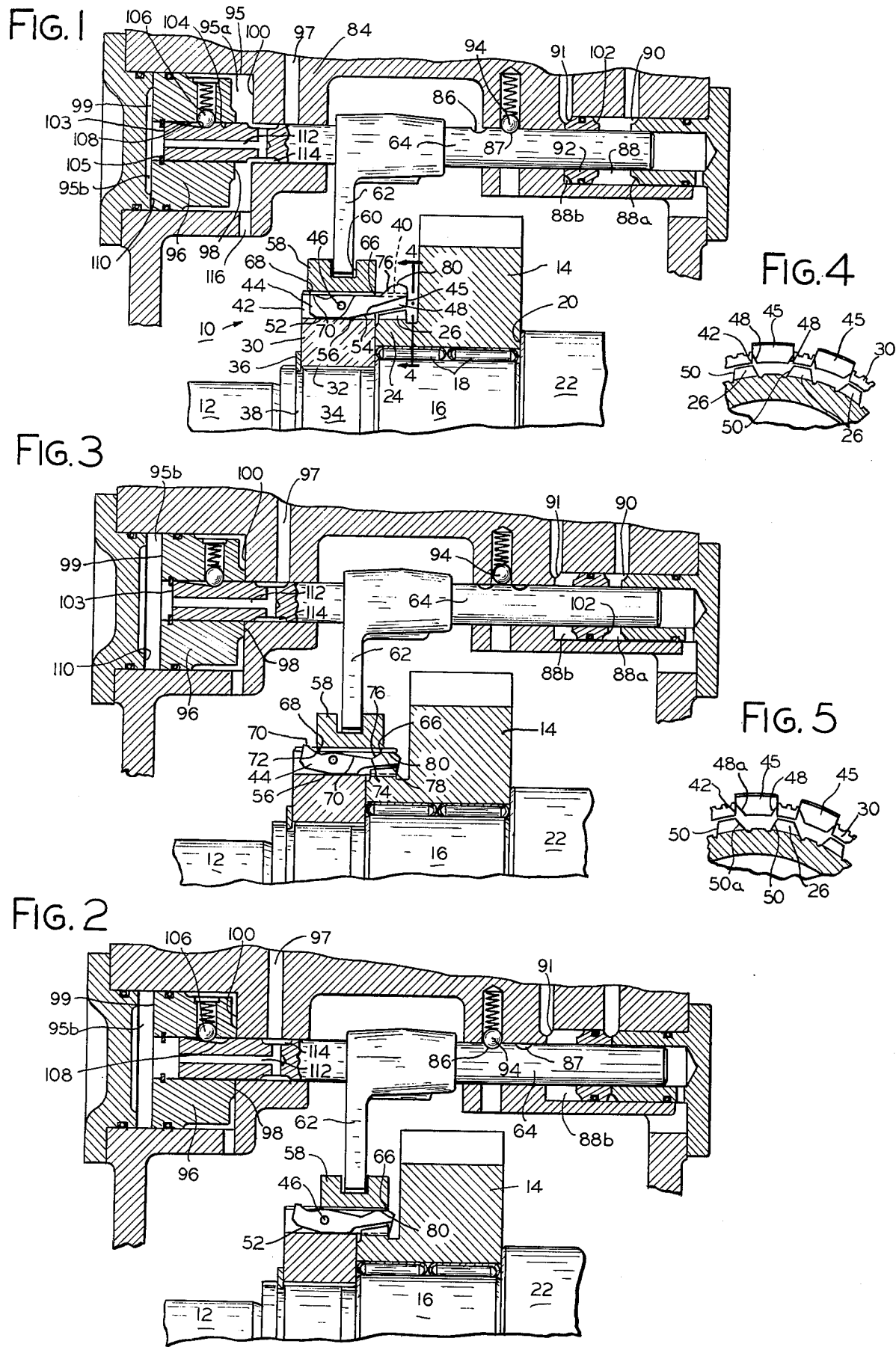

CLUTCH MECHANISM

BACKGROUND OF THE INVENTION

1. Field of the Invention

The present invention relates to improved clutch mechanisms for selectively connecting two adjacent rotatable driving and driven members. This invention may be utilized, for example, for engaging the gears or other torque transmitting means in change speed transmissions and the like. This improved clutch mechanism moves a clutch member from a locked engaged position to an unlocked engaged position and maintains this clutch member in the unlocked engaged position at a predetermined torque level until this torque level is exceeded by torque transfer between the driving and driven members.

2. DESCRIPTION OF THE PRIOR ART

Rocker arm clutch mechanisms include a rotatable driving member and a rotatable driven member wherein a carrier is fixed to one of these members, with the carrier having circumferentially spaced rocker arms that are adapted to be rocked radially, on at least one end, by means of a collar and shift yoke, for selective rocking engagement into coupling engagement with adjacent clutch portions on the other of the driving and driven member. This rocker action eliminates the axial shift movement heretofore required and materially reduces the spacing required between the driving and driven members since there is no axial sliding movement of the coupling members but only a radial rocking action.

Rocker arm clutch mechanisms are well known in the art, including those set forth in U.S. Pat. No. 2,447,058 to Dence; U.S. Pat. No. 2,412,208 to Dence; U.S. Pat. No. 2,558,656 to Lapsley; U.S. Pat. No. 2,584,032 to Lapsley and U.S. Pat. No. 3,024,885 to Dence et al. While all the structures shown in these patents are readily workable, none of them suggest or teach the improvement of this invention, i.e., means for axially shifting the clutch collar to an unlocked engaged position intermediate the locked neutral and locked engaged positions and yieldingly maintaining the collar in the unlocked engaged position at a predetermined torque level until this torque level is exceeded by the torque transfer between the driving and driven members. Basically, this improvement allows unlocked engagement between the driving and driven members but permits disengagement therebetween if the torque exceeds a predetermined level.

SUMMARY OF THE INVENTION

The instant invention sets forth a clutch of the type wherein a carrier, interposed between a rotatable driving and rotatable driven member, is fixed to one of these members and has a series of circumferentially spaced axially extending slots in the periphery thereof. The other of the driving and driven members has normally self-disengaging clutch portions adjacent to the carrier. Rocker arms are carried in the carrier slots, for substantially the full length thereof, and have corresponding normally self-engaging clutch portions disposed in radial alignment with the clutch portions of the other of the members. The rocker arms are provided with cam surfaces and, a continuous collar, mounted for selective axial shifting movement on the carrier, engages the cam surfaces for alternately radially moving the corresponding clutch portions of the rocker arms into and out of engagement with the clutch portions of the other of the driving and driven members. An axially movable yoke, mounted on a shift rail, is connected with the collar and means are provided for actuating the yoke to affect axial shifting of the collar, on the carrier, from a locked neutral position to a locked engaged position and vice versa. The improvement comprises that this actuating means includes further means for both axially shifting the collar to an unlocked engaged position and means for maintaining the axial position of the collar in this unlocked engaged position at a predetermined torque level. This predetermined torque level opposes the shifting of the collar back to locked neutral position until this torque level is exceeded by the torque transfer between the driving and driven members. The means for axially shifting the collar to the unlocked engaged position includes first piston means secured to one end of the shift rail and second piston means surrounding and yieldingly connected to other end of the shift rail. A fluid supply means is capable of simultaneously supplying fluid under pressure to the side of the first piston means remote from the second piston means and for supplying fluid under pressure to the side of the second piston means remote from the first piston means, when the collar is in its locked engaged position. The second piston means has a greater piston area than the first piston means, with a predetermined torque level, equalling the difference between the opposing pressures applied to the shift rail by the first and second piston means via the side of the first piston remote from the second piston means and the side of the second piston means remote from the first piston means, respectively. When the predetermined torque level is exceeded by the torque transfer between the driving and driven member, the collar is axially shifted back to locked neutral position, with the axial shifting of the collar closing off the fluid supply to the side of the second piston means remote from the first piston means. In addition, the opposite sides of each of the self-disengaging clutch portions of the rocker arms and of the other of the driving and driven members are not allochiral or symmetrical thereby causing different declutching values in the clockwise and counterclockwise directions.

Other advantages and features of the instant invention will be understood from the following description in conjuncntion with the attached drawings.

BRIEF DESCRIPTION OF THE DRAWINGS.

FIG. 1 is a side view, partly in section and partly in elevation, of the improved gear engaging means or clutch mechanism of this invention in the disengaged position.

FIG. 2 is a corresponding view showing the mechanism of FIG. 1 in an engaged and locked position.

FIG. 3 is a corresponding view illustrating the clutch mechanism of FIG. 1 in an engaged but subject-to-disengaged position.

FIG. 4 is a simplified end view, partially in section, looking in the direction of arrows 4—4 of FIG. 1.

FIG. 5 illustrates a modification of the structure in FIG. 4.

DESCRIPTION OF THE PREFERRED EMBODIMENT.

Referring now to the drawings in detail, FIGS. 1 to 3 show the improved gear engaging or clutch mechanism, generally indicated at 10, which may be used, for example, in a power transmission for selectively clutching a gear to a shaft. As will become apparent as the description proceeds, the application of this improved clutch mechanism to a variety of other selective coupling problems will be apparent to thosee skilled in the art.

Referring now to FIG. 1, a rotatable stepped shaft 12 has a gear 14 journaled on shaft step portion 16 by means of needle or roller bearings 18 interposed therebetween, with either of shaft 12 or gear 14 being the driving or the driven member. Gear 14 is held against axial movement on one end by abutting annular shoulder 20 between shaft portions 16 and 22.

Gear 14 is also provided with a reduced hub portion 24 having clutch teeth or portions 26 formed thereon, with portions 26 being tapered in an axial direction toward the main portion of gear 14.

The outer end surface of reduced hub 24 is held against axial movement by abutting the inner end surface of hub or carrier member 30, of annular form, which is keyed, splined or otherwise secured, as at 32, to a reduced step portion 34 of shaft 12. The outer end surface of hub or carrier 30 is held against axial movement by a washer 36 in shaft groove 38. Hub member or carrier 30 is also axially extended, as indicated at 40, to overlie clutch teeth or portions 26 in a radial direction.

Carrier 30 has axial slots 42 formed at circumferentially spaced points therein, there being a plurality of such slots formed around the annular surface thereof. Disposed within each of these circumferentially spaced, longitudinally-extending, radial slots 42 is a rocker member 44, with member 44 being supported against circumferential displacement by means of the shoulder portions 40 forming extensions of slots 42. Each rocker member 44 is axially held from movement in its respective slot by means of a pin or pivot 46.

Generally, each rocker member 44 extends longitudinally of carrier 30, is fulcrummed intermediate its ends on the carrier, and has one end portion 45 disposed in radial overlying relation to clutch portions 26. At the radially inward edge thereof, each clutch part or rocker member 44 has a horizontally extending flat portion 52 and an inclined portion 54 that converges radially inwardly to meet portion 52 so as to define a rocker or fulcrum line 56. Rocker members 44 are axially extended, via end portions 45, into position to extend between clutch portion 26 (see FIG. 4) and are provided at ends 45 with corresponding surfaces for engagement with these clutch portions. It will be noted that the defining walls of slots 42 provide an adequate backing surface preventing any displacement or skewing of the rocker members relative to hub or carrier 30. As best seen in FIG. 4, rocker member end portions 45 are provided with tapered sides 48 and clutch portions 26 have correspondingly tapered sides 50, the purpose of which will be more fully described as the present description proceeds.

Mounted in splined engagement on the annular surface of carrier 30 about the slots 42 and the intermediate surfaces of the carrier between the slots is an axially shiftable collar or yoke 58 having a reduced annular groove 60 for receiving a shifter yoke 62 carried by shift rail 64. When shift rail 64 is the position shown in FIG. 1, collar member 58 is in a neutral position, with collar member 58 having internal edge surfaces 66 and 68, at its opposite sides, engageable with horizontally extending flat portion 70 of rocker member 44. Flat surface 70 is interrupted by a recessed cam surface 72 (FIG. 3) and merges, as at 74, into first cam portion 76 of rocker member end portion 45. First cam portion 76 itself merges, as at 78, into second cam portion 80 of rocker member end portion 45.

When shift rail 62 is moved to the right, as best shown in FIG. 3, collar member 58 is correspondingly shifted axially over surface 70 of rocker member 44 and when its internal edge surface 66 makes contact with first cam portion 76 at intersection 74, then rocker member 44 rocks about its fulcrum 56 and rocker member end portion 45 is moved downwardly into engagement with clutch portions 26 of gear 14. While internal edge surface 66 rides up on first cam portion 76, carrier internal edge surface 68 is at least partially touches recessed cam surface 72 of surface 70. Thus, rocker member 44 will rock due to the interaction of carrier internal edge surface 66 and first cam portion 76 thereby forcing rocker member edge portion 45 downward as collar 58 moves to the right. FIG. 3 shows the movement of collar 58 to the right as being terminated when internal edge surface 66 approaches the intersection 78 of first cam portion 76 and second cam portion 80. In this position, rocker member end portion 45 is fully engaged with clutch portions 26 of gear 14, thereby clutching gear 14 to carrier 30 for conjoint rotation with shaft 12. Thus, a predetermined amount of torque, as will be explained hereinafter in more detail, can be transferred either from shaft 12 to gear 14 or vice versa.

FIG. 2 shows that when collar 58 is axially moved to its maximum right hand position, collar edge surface 66 will pass completely over rocker member second cam portion 80, with collar 58 thereby locking rocker member end portions 45 into mesh with clutch portions 26 of gear 14. During the axial movement of collar 58 from the FIG. 2 or FIG. 3 position back to the FIG. 1 position, when there is little or no torque transfer between shaft 12 and gear 14, it is of course the interaction between collar edge surface 68 and recessed cam surface 72 that will cause rocker member 44 to rock back to its neutral position.

As previously noted, collar 58 is axially translated or actuated by means of shift yoke 62 carried by shift rail 64 which in turn is slidably received in a portion 84 of a housing which also contains shaft 12 and gear 14.

The right hand portion of shift rail 64, which is provided with detent portions 86 and 87, passes through a cylinder 88 having fluid ports 90 and 91 on opposite ends thereof. An annular piston member 92 surrounds a portion of shift rail 64 within cylinder 88, thereby dividing cylinder 88 into opposing variable volume chambers 88a and 88b. Upon momentary application of fluid pressure through port 90 into chamber 88a, piston member 92 and shift rail 64 are translated to the left thereby disengaging rocker member end portions 45 from gear clutch portions 26. In this disengaged or neutral position, spring biased ball member 94 is engaged in shift rail detent portion 87 as shown in FIG. 1.

In the FIG. 1 position, the left hand end portion 103 of shift rail 64 is shown as extending into the central aperture or bore 104 of a free piston member 96. Portion 103, which is restrained against further outward axial movement by retaining members or washer 105 in piston bore 104, is yieldingly retained against further inward axial movement by spring biased ball member 106 that engages shift rail detent portion 108.

Free piston member 96, which is confined in a cylinder 95, divides cylinder 95 into opposing variable volume chambers 95a and 95b. In the FIG. 1 position, the generally circular outer end face or area 99 of piston member 96 abuts the outer end face 110 of chamber 95b, while in the FIG. 2 position, the generally annular inner end face 98 of piston member 96 abuts the inner annular end wall 100 of chamber 95a.

Left end portion 103 of shift rail 64 is also provided with an axial central bore 112, the outer end of which opens into chamber 95b whereas its inner end merges into a reduced diameter portion 114 of shift rail 64. As will be explained in more detail later, in certain axial positions of shift rail 64, portion 114 will be operatively connected with a fluid pressure port 97 in housing portion 84 for permitting a fluid pressure buildup in chamber 95b.

The momentary application of fluid pressure on piston 92, solely into chamber 88b through port 91, axially translates shift rail 64 fully to the right, as shown in FIG. 2, and permits the engagement of ball member 94 in detent portion 86 thereby holding the collar 58 against axial movement and locking rocker member end portion 45 in meshing engagement with clutch portions 26 of gear 14. Thereupon, since this engaging movement between clutch portions 26 and rocker members 44 is radial, the hub strength of collar 58 holds rocker members 44 firmly in position, thus insuring that there can be no unauthorized declutching or, if used in a transmission, can the transmission jump out of gear as is possible with other types of transmission clutches. The use of spring-biased ball member 106, of course, permits disengagement between shift rail 64 and piston 96 when piston annular end face 98 abuts cylinder annular end face 100, thus allowing shift rail 64 to translate fully to the right.

Certain clutching and/or transmission applications require that the locking action described with reference to FIG. 2 (wherein a portion of collar 58 completely covers or surrounds rocker member second cam portion 80 and shift rail 64 is held against axial movement by ball member 94 in detent portion 86) be averted during either an engaging or a disengaging sequence and, in fact, it might be required, for example, to have the driving torque in gear 14 uncouple gear 14 from shaft 12 without damage to either member and at a predetermined torque level. This uncoupling or declutching can be permitted to occur at a predetermined torque level, for example, when shift rail 64 is in the FIG. 2 position, by applying fluid pressure through port 97 into chamber 95b against the circular end surface 99 of piston 96 to thereby retain piston annular end face 98 against cylinder annular end face 100. Simultaneous to the application of fluid pressure through port 97, fluid pressure is also applied through port 90 into chamber 88a, thereby displacing piston 92 and shift rail 64 to the FIG. 3 position. Since the annular area 102 of piston member 92 is, of course, smaller than the generally circular area 99 of piston member 96, the fluid pressure in chambers 88a and 95b will keep shift rail 64 in the FIG. 3 position. In the FIG. 3 position, the left end portion 103 of shift rail 64 abuts washer 105 within bore 104 of piston member 96 and collar internal edge surface 66 is substantially aligned with or rests on top of intersection 78 between rocker member first and second cam portions 76 and 80 respectively.

At this time, ball member 94 is intermediate and engaged in neither of shift rail detent portions 86 and 87. If the force available from area 99 minus area 102, at a predetermined pressure level, is exceeded by the force placed on collar or yoke 58 (to the left), then rocker member end portions 45 will disengage from clutch portions 26 of gear 14. It will, of course, be appreciated that the counterclockwise force on rocker member end portions 45, which is forcing collar 58 to move to the left (via first cam portions 76 acting on internal edge surface 66), is derived from tapered sides 48 and 50 (see FIG. 4) of rocker member end portions 45 and clutch portions 26 respectively. Since these tapered sides are set at an angle, the driving torque of gear 14 will move rocker member end portions 45 upward (counterclockwise) and thereby displace collar 58 back to the FIG. 1 position, thereby declutching or decoupling gear 14 from shaft 12.

The axial extent of shift rail reduced diameter portion 114 is such that it will be in communication with port 97 (and thus permitting fluid pressure buildup in chamber 95b, if so desired) when rocker member portions 45 are in an engaged and locked position (FIG. 2) and in an engaged but subject-to-disengaged position (FIG. 3). In the neutral position (FIG. 1), there is no communication between port 97 and shift rail portion 114, with the latter being in communication chamber 95a to permit the draining (via conduit 116) of the remainder of the fluid from chamber 95b after port 97 is shut off during the movement of shift rail 64 from the FIG. 3 to the FIG. 1 position. It should be realized that the fluid pressure input to chamber 95b has to shut off when rail 64 is forced to the left (i.e., from the FIG. 3 to the FIG. 1 position) otherwise, since the force in chamber 95b is greater than the force in chamber 88a, if the force placed on collar 58 decreases to less than the difference between these two forces, then shift rail 64 would be forced back to the FIG. 3 position or it could oscillate between the FIG. 1 and FIG. 3 positions which is not only undesirable but could also cause excessive wear on rocker member portions 45 as well as clutch portions 26. Pressure, when applied to port 97, in the FIG. 1 position, will not be effective to move piston 96 to the right until pressure to port 91 axially moves rail 64 to the right for a distance sufficient to permit communication between port 97 and reduced diameter rail portion 114.

It should also be appreciated that while the torque transfer between shaft 12 and gear 14 is bidirectional, the decoupling or declutching values need not be equal. In the FIG. 4 embodiment, since the angles of both tapered sides 48 as well as both sides 50 of rocker member and portions 45 and clutch portions 26, respectively, are equal, the bidirectional declutching values are equal. However, in the FIG. 5 embodiment, since the angle of side 48 (and its mating side 50) and the angle of side 48a (and its mating side 50a) are not symmetrical, the declutching values in the clockwise and counterclockwise directions will be different. Of course, if sides 48 and 50 were straight sided instead of tapered, no force tending to separate rocker member end portions 45 and clutch portions 26 would be present.

For the more popular mode of operation, the uncoupling or declutching between gear 14 and shaft 12 is generally desired to occur when shift rail 64 reaches the FIG. 3 position after initially having been in the FIG. 2 position, but shift rail 64 could just as readily be in the FIG. 1 position prior to reaching the FIG. 3, position.

From the foregoing, it is believed that those familiar with the art will readily recognize and appreciate the novel concepts and features of the present invention. Obviously, while the invention has been described in relation to only a limited number of embodiments, numerous variations, changes and substitutions and equivalents will present themselves to persons skilled in the art and may be made without necessarily departing from the scope and principles of this invention. As a result, the embodiments described herein are subject to various modifications, changes and the like, without departing from the scope and spirit of the invention, with the scope thereof being determined solely by reference to the claims appended hereto.

What is claimed is:

1. In a clutch having a rotatable driving member and a rotatable driven member, a carrier fixed to one of said members, axial slots in the periphery of said carrier, rockers in said slots having normally self-disengaging clutching portions on at least the end adjacent to the other of said members, corresponding normally self-disengaging clutching portions on the adjacent end of the other of said members for receiving the clutching portions of said rockers, cam surfaces on said rockers, an axially shiftable collar on said carrier to engage said cam surfaces for rocking said rockers selectively into and out of engagement with said clutching portions of the other of said members, said axially shiftable collar having locked neutral and locked engaged positions on said carrier, wherein the improvement comprises means for axially shifting said collar to an unlocked engaged position intermediate said locked neutral and locked engaged positions and yieldingly maintaining said collar in said unlocked engaged position at a predetermined torque level, with said collar being axially shifted back into locked neutral position by the cam surfaces of said rockers, as a result of the separation of the selfdisengaging clutching portions of both said rockers and the other of said members, when said predetermined torque level acting on said collar is exceeded by the torque transfer between said driving and driven members.

2. The clutch of claim 1 wherein said means for shifting said collar to an unlocked engaged position includes an axially shiftable yoke connected with said collar, a shift rail connected to said yoke, first piston means secured to one end of said shift rail, said first piston means being movable in opposite directions and, second piston means surrounding and yieldingly connected to the other end of said shift rail, said second piston means being capable of limited bidirectional axial movement with said shift rail, said shift rail also being capable of limited bidirectional axial movement with reference to said second piston means.

3. The clutch of claim 2 further including fluid supply means for simultaneously supplying fluid under pressure to the side of said first piston means remote from said second piston means and for supplying fluid under pressure to the side of said second piston means remote from said first piston means when said collar is in its locked engaged position, with the side of said second piston means remote from said first means having a greater piston area than the side of said first piston means remote from said second piston means.

4. The clutch mechanism of claim 3 wherein said predetermined torque level, applied to said collar by said means for axially shifting said collar to an unlocked engaged position, equals the differences between the opposing pressures applied to said shift rail by said first and second piston means via the side of the first piston remote from said second piston means and the side of said second piston means remote from said first pison means, respectively.

5. In the clutch mechanism of claim 4, when said predetermined torque level is exceeded by the torque transfer between said driving and driven member, said collar is axially shifted back to locked neutral position with axial shifting of said collar disrupting the supplying of fluid under pressure to the side of said second piston means remote from said first piston means.

6. In a clutch mechanism having:
   a. a rotatable driving member;
   b. a rotatable driven member;
   c. a carrier fixed to one of said members, said carrier having a series of circumferentially spaced axially extending slots in the periphery thereof;
   d. the other of said members having normally self-disengaging clutch portions adjacent said carrier;
   e. rocker arms carried in said slots for substantially the full length thereof and having corresponding normally self-disengaging clutch portions disposed in radial alignment with the clutch portions of the other of said members;
   f. cam surfaces on said rocker arms;
   g. a continuous collar mounted for selective axial shifting movement on said carrier to engage said cam surfaces for alternately radially moving the corresponding clutch portions of said rocker arms into and out of engagement with the clutch portions of the other of said members;
   h. an axially movable yoke connected with said collar; and
   i. means for actuating said yoke to effect axial shifting of said collar on said carrier from a locked neutral position to a locked engaged position and vice versa, wherein the improvement comprises that said means for actuating said yoke includes means for both axially shifting said collar to an unlocked engaged position and means for maintaining the axial position of said collar in said unlocked engaged position at a predetermined torque level in opposition to being shifted back to locked neutral position until said predetermined torque level is exceeded by torque transfer between said driving and driven members.

7. The clutch mechanism of claim 6 wherein said means for actuating said yoke includes a shift rail connected thereto and said means for axially shifting said collar to an unlocked engaged position includes first piston means secured to one end of said shift rail, said piston means being movable in opposite directions to import axial movement to said collar, and fluid supply means for alternately supplying fluid under pressure to opposite sides of said piston means.

8. The clutch mechanism of claim 7 wherein said means for maintaining the axial position of said collar in said unlocked engaged position includes second piston means surrounding and yieldingly connected to the other end of said shift rail, said second piston means being capable of limited bidirectional axial movement with said shift rail, said shift rail also being capable of limited bidirectional axial movement with reference to said second piston means, and fluid supply means for supplying fluid under pressure to the side of said second piston means remote from said first piston means.

9. The clutch mechanism of claim 8 including conduit means for supplying fluid under pressure to the side of said second piston means remote from said first piston means only when said collar is in its locked engaged and unlocked engaged positions.

10. The clutch mechanism of claim 9 wherein the side of said second piston means remote from said first piston means has a greater piston area than the side of said first piston means remote from said second piston means.

11. The clutch mechanism of claim 10 wherein said predetermined torque level, applied to said collar by said means for maintaining the axial position of said collar in said unlocked engaged position, equals the difference between the opposing pressures applied to the shift rail by said first and second piston means via the side of said first piston means remote from said second piston means and the side of said second piston means remote from said first piston means, respectively.

12. In the clutch mechanism of claim 11 when said predetermined torque level is exceeded by the torque transfer between said driving and driven member, said collar is axially shifted back to locked neutral position, thereby closing off said conduit means for supplying fluid under pressure to the side of the said second piston means remote from said first piston means.

13. The clutch mechanism of claim 6 wherein the opposite sides of each of said self-disengaging clutch portions of said rocker arms and the other of said members are not symmetrical, thereby causing differing declutching values in the clockwise and counterclockwise directions.

* * * * *